(12) United States Patent
Han et al.

(10) Patent No.: US 11,399,201 B2
(45) Date of Patent: Jul. 26, 2022

(54) APPARATUS AND METHOD FOR ACCELERATING SUPER-RESOLUTION IN REAL-TIME VIDEO STREAMING

(71) Applicant: KOREA ADVANCED INSTITUTE OF SCIENCE AND TECHNOLOGY, Daejeon (KR)

(72) Inventors: Dong Su Han, Daejeon (KR); Hyun Ho Yeo, Daejeon (KR); Young Mok Jung, Daejeon (KR); Chan Ju Chong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/174,506

(22) Filed: Feb. 12, 2021

(65) Prior Publication Data
US 2022/0021916 A1  Jan. 20, 2022

(30) Foreign Application Priority Data
Jul. 17, 2020 (KR) .................. 10-2020-0088762

(51) Int. Cl.
*H04N 21/2343* (2011.01)
*H04L 65/60* (2022.01)
(Continued)

(52) U.S. Cl.
CPC ..... *H04N 21/23439* (2013.01); *G06N 3/0454* (2013.01); *H04L 65/607* (2013.01);
(Continued)

(58) Field of Classification Search
CPC ............... G06T 3/4053; G06T 3/4046; H04N 21/23439; H04N 21/234381;
(Continued)

(56) References Cited

U.S. PATENT DOCUMENTS

2018/0191586 A1* 7/2018 Chen ................. H04L 67/10
2018/0191801 A1* 7/2018 Chen ................. H04L 65/602
(Continued)

FOREIGN PATENT DOCUMENTS

WO  2020/067592 A1  4/2020

OTHER PUBLICATIONS

Chunwei Xia, Jiacheng Zhao, Huimin Cui, Xiaobing Feng, and Jingling Xue. 2019. DNNTune: Automatic Benchmarking DNN Models for Mobile-cloud Computing. ACM Trans. Archit. Code Optim. 16, 4, Article 49 (Dec. 2019), 26 pages, https://dpi.org/10.1145/3368304.*

(Continued)

*Primary Examiner* — Chirag R Patel
(74) *Attorney, Agent, or Firm* — Sughrue Mion, PLLC

(57) ABSTRACT

The present disclosure seeks to perform real-time video streaming on a mobile device toward maintaining user QoE even under bandwidth constraints while being acceptable to the lightweight computing capacity of the mobile device. To this end, the embodiments apply deep neural network-based SR to a small number of pre-selected video frames and utilize the video frames to which SR is applied to enhance the resolution of the remaining frames, wherein the pre-selected frames are chosen for SR within a preset quality margin. Additionally, the present disclosure provides an apparatus and a method for SR acceleration for real-time video streaming under the lightweight computing capacity and video-specific constraints of a mobile device, which allow a server to deliver multiple options on a deep neural network and a cache profile including SR application information and enable the mobile device to select an option suitable for its computing capacity.

20 Claims, 8 Drawing Sheets

*100*

(51) Int. Cl.
  *H04L 65/80* (2022.01)
  *H04N 21/2662* (2011.01)
  *G06N 3/04* (2006.01)

(52) U.S. Cl.
  CPC ..... *H04L 65/80* (2013.01); *H04N 21/234381* (2013.01); *H04N 21/2662* (2013.01)

(58) Field of Classification Search
  CPC ... H04N 21/2662; H04L 65/607; H04L 65/80; G06N 3/0454; G06N 3/08; G06N 20/00; G06N 3/02
  See application file for complete search history.

(56) References Cited

U.S. PATENT DOCUMENTS

| | | | | |
|---|---|---|---|---|
| 2018/0332281 | A1* | 11/2018 | Yu | H04N 19/91 |
| 2019/0045248 | A1* | 2/2019 | Shen | H04L 65/608 |
| 2020/0126187 | A1* | 4/2020 | Park | H04L 65/4069 |
| 2020/0374573 | A1* | 11/2020 | Zhu | H04L 65/4084 |
| 2021/0266496 | A1* | 8/2021 | Qin | G06T 3/4046 |

OTHER PUBLICATIONS

Lin et al., "Improved Low-Bitrate HEVC Video Coding Using Deep Learning Based Super-Resolution and Adaptive Block Patching", IEEE Transactions on Multimedia, vol. 21, No. 12, Dec. 2019, pp. 3010-3023, XP011757326 (14 pages total).

Yeo et al., "NEMO: Enabling Neural-enhanced Video Streaming on Commodity Mobile Devices", MobiCom '20, Sep. 21-25, 2020, London, UK, pp. 363-376, XP058479937 (14 pages total).

Extended European Search Report dated Jul. 15, 2021 from the European Patent Office in EP Application No. 21156689.8.

Royson Lee et al., "MobiSR: Efficient On-Device Super-Resolution through Heterogeneous Mobile Processors", The 25th Annual International Conference on Mobile Computing and Networking, 2019, 16 pages.

Hyunho Yeo et al., "Neural Adaptive Content-aware Internet Video Delivery", Proceedings of the 13th USENIX Symposium on Operating Systems Design and Implementation (OSDI'18), 2018, pp. 645-661.

Hongzi Mao et al., "Neural Adaptive Video Streaming with Pensieve", In Proceedings of the ACM Special Interest Group on Data Communication (SIGCOMM), 2017, pp. 197-210.

* cited by examiner

APPARATUS AND METHOD FOR ACCELERATING SUPER-RESOLUTION IN REAL-TIME VIDEO STREAMING

CROSS-REFERENCE TO RELATED APPLICATIONS

This application claims priority from Korean Patent Application No. 10-2020-0088762 filed on Jul. 17, 2020, the disclosure of which is incorporated by reference herein in its entirety.

FIELD OF INVENTION

The present disclosure in some embodiments relates to an apparatus and method for accelerating super-resolution in real-time video streaming. More particularly, the present disclosure relates to an apparatus and a method for super-resolution acceleration in real-time video streaming on a mobile device, which are capable of maintaining user QoE even under bandwidth constraints while being acceptable to the lightweight computing capacity of the mobile device.

BACKGROUND OF INVENTION

The statements in this section merely provide background information related to the present disclosure and do not necessarily constitute prior art.

With the advent of omnipresent smartphones, tablets, and such mobile devices, demand is exploding for mobile video streaming. In connection with such demand expansion, it is becoming very important to provide users with a high Quality of Experience (QoE) to meet the expectations for quality. To meet the growing video demand, mobile carriers and Contents Delivery Networks (CDNs) are constantly striving to expand bandwidth. Additionally, in concert with efforts to maximize QoE in the context of bandwidth constraints, significant progress has been achieved in fields such as adaptive streaming and super-resolution (SR).

As one of the techniques for dealing with bandwidth constraints, there is adaptive streaming (Non-Patent Document 1). In adaptive streaming, a server encodes and splits a video at multiple bitrates into video chunks of an appropriate length (e.g., 2-10 seconds). The client utilizes an adaptive bitrate (ABR) algorithm to select an appropriate quality of video chunks for the bandwidth situation. Despite the improvement in optimizing bitrate and server selection, adaptive streaming has a fundamental matter that user QoE according to video quality depends on the available network bandwidth.

On the other hand, there is SR as one of the techniques for improving the quality of low-resolution videos. Recently, visible progress has been achieved in improving the speed and performance of SR based on a deep neural network (DNN). Despite these advances, however, SR is a very expensive technology and suffers from vulnerable video quality to the computing capacity of the responsible device.

As one of the technologies that combine the ABR algorithm and SR, there is a content-aware neural adaptive streaming (NAS) (see Non-Patent Document 2). In the NAS, a server trains multiple SR DNNs based on content recognition for a video and then provides the trained multiple SR DNNs and corresponding video chunks. The client can use an integrated ABR algorithm to determine whether to receive an SR DNN or video chunk. Upon obtaining the multiple SR DNNs, the client may apply SR to the transmitted video to generate a high-resolution video. For low-resolution video transmitted at a low bit rate due to bandwidth constraints, the NAS is entirely dependent on the computing capacity on the client side, despite its opportunity to improve the video quality independently of the network bandwidth by using the SR DNN. This inhibits a mobile device from carrying out real-time video streaming.

Compared with the desktop-class graphics processing unit (GPU) used in the existing technology, in essence, the mobile device suffers from a comparatively weak computational capacity in connection with its stubborn power constraint. For example, even State Of The Art (SOTA) mobile SR for image processing (refer to Non-Patent Document 3) shows limitations in real-time video processing.

Accordingly, in real-time video streaming, there is a need for a method for SR acceleration capable of maintaining user QoE even under bandwidth constraints while being acceptable to the lightweight computing capacity of a mobile device.

SUMMARY

The present disclosure in some embodiments seeks to perform real-time video streaming on a mobile device toward maintaining user QoE even under bandwidth constraints while being acceptable to the lightweight computing capacity of the mobile device. To this end, some embodiments apply deep neural network (DNN)-based SR to a small number of pre-selected video frames and utilize the video frames to which SR is applied to enhance the resolution of the remaining frames, wherein the pre-selected frames are chosen for SR within a preset quality margin. Additionally, the present disclosure in some embodiments seeks to provide an apparatus and a method for SR acceleration for real-time video streaming under the lightweight computing capacity and video-specific constraints of a mobile device, which allow a server to deliver multiple options on a deep neural network and a cache profile including SR application information and enable the mobile device to select an option suitable for its computing capacity.

At least one aspect of the present disclosure provides a method performed by a mobile device for accelerating a super-resolution (SR), including obtaining a manifest file for a video from a server, and selecting, from the manifest file, an option on a super-resolution deep neural network (SR DNN) and information on a cache profile, and transmitting the option and the information on the cache profile to the server and obtaining, from the server, an SR DNN corresponding to the option, a cache profile, and video chunks, and initializing an SR-integrated decoder by using the SR DNN and then enhancing, based on the cache profile, a resolution of a current frame that forms the video chunks by using the SR-integrated decoder.

Another aspect of the present disclosure provides an apparatus for super-resolution (SR) acceleration installed in a mobile device, including an input/output unit and a decoding unit. The input/output unit is configured to obtain a manifest file for a video from a server, to select, from the manifest file, an option on a super-resolution deep neural network (SR DNN) and information on a cache profile, and to transmit the option and the information on the cache profile to the server and obtain, from the server, an SR DNN corresponding to the option, a cache profile, and video chunks. The decoding unit is configured to initialize an SR-integrated decoder by using the SR DNN and then enhance, based on the cache profile, a resolution of a current frame that forms the video chunks by using the SR-integrated decoder.

Yet another aspect of the present disclosure provides a method performed by a server for super-resolution (SR) acceleration, including obtaining a video, and generating multiple video versions corresponding to multiple bitrates from the video by using an image encoder, and training, by using the video and the multiple video versions, corresponding multiple super-resolution deep neural networks (SR DNNs), and selecting anchor frames, one each for each of the multiple SR DNNs from the video versions, as bounded by a preset quality margin and generating a cache profile including information on the anchor frames, and generating a manifest file including information on the cache profile and information on the multiple SR DNNs.

Yet another aspect of the present disclosure provides a computer program stored in a computer-readable medium for executing the steps respectively included in the method performed by a mobile device for super-resolution acceleration.

Yet another aspect of the present disclosure provides a computer program stored in a computer-readable medium for executing the steps respectively included in the method performed by a server for super-resolution acceleration.

As described above, the present disclosure in some embodiments provides an apparatus and a method for SR acceleration which operate in performing real-time video streaming on the mobile device, to apply deep neural network (DNN)-based SR to a small number of pre-selected video frames and utilize the video frames to which SR is applied to enhance the resolution of the remaining frames, resulting in an increased video processing throughput of the mobile device, reduced energy consumption to maintain heat at an appropriate level, and an improved user QoE even under bandwidth constraints.

Furthermore, the present disclosure in some other embodiments provides an apparatus and a method for SR acceleration which operate in performing real-time video streaming on a mobile device, to allow the server to deliver multiple options on the deep neural network and the cache profile including SR application information and enable the mobile device to select an option suitable for its computing capacity and thereby enabling the real-time video streaming to be performed under the lightweight computing capacity and video-specific constraints of the mobile device.

DETAILED DESCRIPTION

Figure 1:
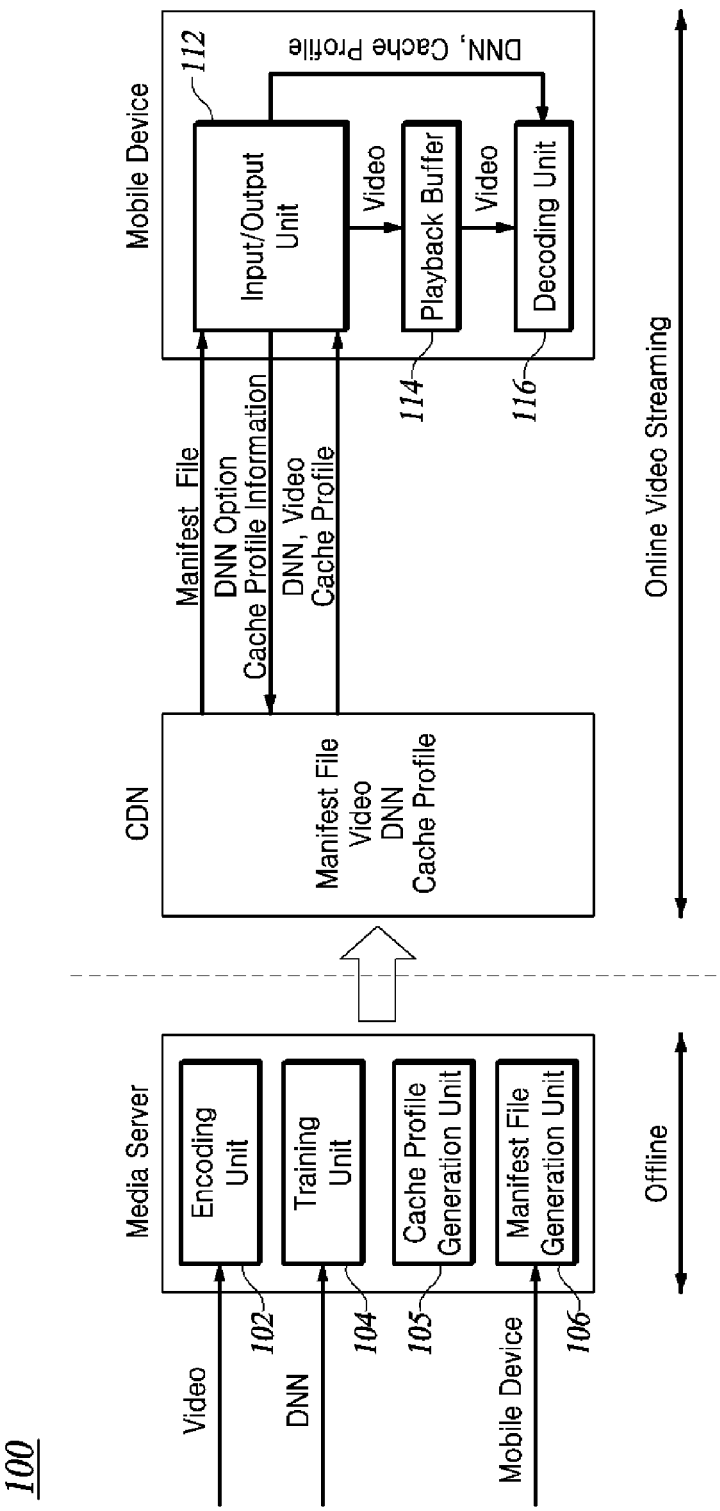
FIG. 1 is a schematic block diagram of a super-resolution (SR) acceleration apparatus according to at least one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following documents or publications are cited in the present disclosure.

(Non-patent Document 1) MPEG-DASH Specification. https://dashif.org/.

(Non-patent Document 2) Hyunho Yeo, Youngmok Jung, Jaehong Kim, Jinwoo Shin, and Dongsu Han, 2018. Neural adaptive content-aware internet video delivery. In 13th {USENIX} Symposium on Operating Systems Design and Implementation ({OSDI} 18). 645-661.

(Non-patent Document 3) Royson Lee, Stylianos I Venieris, Lukasz Dudziak, Sourav Bhattacharya, and Nicholas D Lane. 2019. MobiSR: Efficient On-Device Super-Resolution through Heterogeneous Mobile Processors. In The 25th Annual International Conference on Mobile Computing and Networking. 1-16.

(Non-patent Document 4) Webm Official Website. https://www.webmproject.org/.

(Non-patent Document 5) Google's Exoplayer Official Website. https://developer.android.com/guide/topics/media/exoplayer.

(Non-patent Document 6) Xiaomi Mi9 Specifications. https://www.gsmarena.com/xiaomi_mi_9-9507.php.

(Non-patent Document 7) https://www.youtube.com/

(Non-patent Document 8) Wowza's DASH bitrate recommendation. https://www.wowza.com/docs/how-to-encode-source-video-for-wowza-stream ing-cloud.

(Non-patent Document 9) Hongzi Mao, Ravi Netravali, and Mohammad Alizadeh. 2017. Neural Adaptive Video Streaming with Pensieve. In Proceedings of the ACM Special Interest Group on Data Communication (SIG-COMM). 197-210.

The detailed description to be disclosed below with the accompanying drawings is intended to describe illustrative embodiments of the present disclosure and is not intended to represent the only embodiments in which the present disclosure can be practiced.

The present disclosure presents in some embodiments an apparatus and a method for accelerating super-resolution (SR) in real-time video streaming. More specifically, the present disclosure relates to an apparatus and a method for super-resolution acceleration in real-time video streaming on a mobile device, which are capable of maintaining user Quality of Experience (QoE) even under bandwidth constraints while being acceptable to the lightweight computing capacity of the mobile device.

Hereinafter, the apparatus and method for SR acceleration according to the present disclosure uses, but not necessarily limited to, a mobile device such as a smartphone, a tablet, etc. as a client which may be targeted extensively to devices with sufficient capacities, such as a desktop computer, set-top box, and the like. Hereinafter, it is assumed that one video includes a plurality of video chunks. It is assumed that one video chunk includes at least one Group of Pictures (GOP) and that the GOP includes a plurality of frames.

FIG. 1 is a schematic block diagram of a super-resolution (SR) acceleration apparatus according to at least one embodiment of the present disclosure.

In real-time video streaming on a mobile device, the SR acceleration apparatus 100 according to some embodiments of the present disclosure applies a deep neural network (DNN)-based SR to a small number of video frames selected in advance and utilizes the SR-processed frames for enhancing the resolution of the remaining frames, wherein the select frames are selected for SR within a preset quality margin. The SR acceleration apparatus 100 (hereinafter referred to as "SR accelerator") may be distributed among and installed in a media server (hereinafter referred to as "server"), a contents delivery network (CDN), and a mobile device to implement real-time video streaming.

The SR accelerator 100 that is installed in the server performs a preparation process for real-time video streaming, which process may be performed offline. The server delivers the prepared data to the CDN. Meanwhile, a real-time video streaming process between the SR accelerators that are installed on the CDN and the mobile device may be performed online.

FIG. 1 illustrates an example configuration according to this embodiment, and the present disclosure envisions various other configurations having different components or different interconnections between components according to the structures and operations for real-time video streaming of a particular media server, a particular CDN, and a particular mobile device.

To prepare for real-time video streaming, the server generates, from the video, multiple video versions having different bit rates, trains SR DNNs corresponding to the respective video versions, and selects, for each SR DNN, anchor frames to undergo SR within the preset quality margin. To this end, the server may include all or some of an encoding unit 102, a training unit 104, a cache profile generation unit 105, and a manifest file generation unit 106.

The encoding unit 102 includes an image encoder and is responsive to a high-resolution video when uploaded to the server for generating, from the high-resolution video, multiple video versions having different bit rates by using the image encoder. For example, when the high-resolution video is in the 1080p format, the multiple video versions may include low-resolution videos with such a resolution as 240p, 360p, or 480p.

The training unit 104 utilizes the high-resolution video and the multiple video versions for training the corresponding multiple SR DNNs.

This embodiment employs as the DNN a neural network based on a convolutional neural network (CNN) known to be suitable for image signal processing (see Non-Patent Document 2), although the present disclosure is not limited thereto but can use any type of neural network as long as it can perform image transformation. Hereinafter, unless otherwise specified, DNN and SR DNN refer to the same thing and may be used interchangeably.

The cache profile generation unit 105 selects, for each SR DNN, from among the video versions, anchor frames for applying SR within the quality margin and generates a cache profile including information on the anchor frame. For example, as information on the anchor frames, 1 bit of data may be allocated for each frame, for distinguishing the anchor frames from the remaining frames.

Here, the quality margin is a configurable parameter and is a margin of quality when SR is applied to every frame of a video or video version. The server may select different anchor frames according to the quality margin and the respective video versions and generate corresponding cache profiles.

The manifest file generation unit 106 generates a manifest file including information on the cache profile and information on the multiple SR DNNs. Here, the information on the cache profile is the storage location of the cache profile in the CDN, and it may be, for example, information on a uniform resource locator (URL) through which the cache profile can be transmitted and received.

Each mobile device (or a processor which the mobile device includes) has a different computing capacity. Accordingly, to support real-time processing under these constraints, the server may provide a plurality of options having different capabilities for the respective video versions. Here, a plurality of options may mean multiple DNNs. Thus, the server may provide different DNNs depending on the video versions and performance options. The training unit 104 may train the multiple different DNNs according to the video versions and performance options.

The manifest file includes DNN options according to the respective video versions and the computing capacity, and information on a cache profile according to the quality margin and DNN options. Additionally, the manifest file may include a list of mobile devices that can be supported by the respective DNN options.

The server provides the CDN with data including the video versions, DNNs, cache profiles, and manifest files, and the CDN utilizes the provided data to perform real-time video streaming for the mobile device.

When the mobile device requests a video, the CDN transmits the relevant manifest file to the mobile device. Additionally, upon obtaining information on an option on a DNN selected from a manifest file and a cache profile from the mobile device, the CDN transmits the DNN suitable for the option, cache profile, and chunks of the video versions to the mobile device.

The mobile device selects an option on a DNN and information on a cache profile from the manifest file. Additionally, the mobile device transmits information on the selected option and cache profile to the CDN to obtain therefrom DNN, cache profile, and frames forming video. The mobile device utilizes the DNN to initialize an SR-integrated decoder for subsequently using the same to enhance the resolution for each frame based on the cache profile. To this end, the mobile device may include all or some of an input/output unit 112, a playback buffer 114, and a decoding unit 116.

The input/output unit 112 obtains the manifest file for the video desired to be played from the CDN and selects, from the manifest file, information on a cache profile and an option for each DNN for each of the video versions. Selecting an option for each DNN means that each DNN is selected for each video version. The manifest file includes a list of mobile devices supported by options of each DNN, wherein the list may be used to select an option suitable for the computing capacity of the mobile device.

This embodiment assumes a case of applying adaptive streaming, and therefore chunks of different video versions may be delivered depending on the available bandwidth. Accordingly, the mobile device requires a DNN for each video version, and for each DNN, a selection may be made for an option suitable for the computing capacity of the mobile device.

The input/output unit 112 transmits information on the selected option and the cache profile to the CDN to obtain therefrom the DNN suitable for the option, cache profile, and chunks of the video versions. The input/output unit 112 obtains the DNN suitable for the option on each video version, cache profile, and the chunks of video versions. At this time, the input/output unit 112 may use an integrated ABR algorithm (see Non-Patent Document 2). Accordingly, for each DNN option, upon obtaining the whole DNN, the mobile device may perform SR acceleration, or, in case of a scalable DNN, it may perform SR acceleration upon receiving some of the whole DNN.

The playback buffer 114 stores a bunch of downloaded video versions.

The decoding unit 116 includes the SR-integrated decoder, initializes the SR-integrated decoder by using the DNN, and then utilizes the SR-integrated decoder to enhance the resolution of each frame based on the cache profile. As described above, the cache profile includes information on whether a frame forming the video chunks is an anchor frame for applying the DNN.

When using the SR-integrated decoder, the decoding unit 116 is responsive to a receipt of anchor frame information stored in the cache profile for applying DNN to a frame when that frame is an anchor frame or utilizing a previous cached high-resolution frame when that frame is not an anchor frame to generate a high-resolution frame for the current frame and then cache the high-resolution frame for future use.

The decoding unit 116 may initialize the SR-integrated decoder by using a DNN for each video version. Therefore, according to the transmitted video version, the DNN for the SR-integrated decoder to utilize may be changeable.

Hereinafter, a method for SR acceleration will be described by the illustrations of FIGS. 2a and 2b.

Figure 2A:
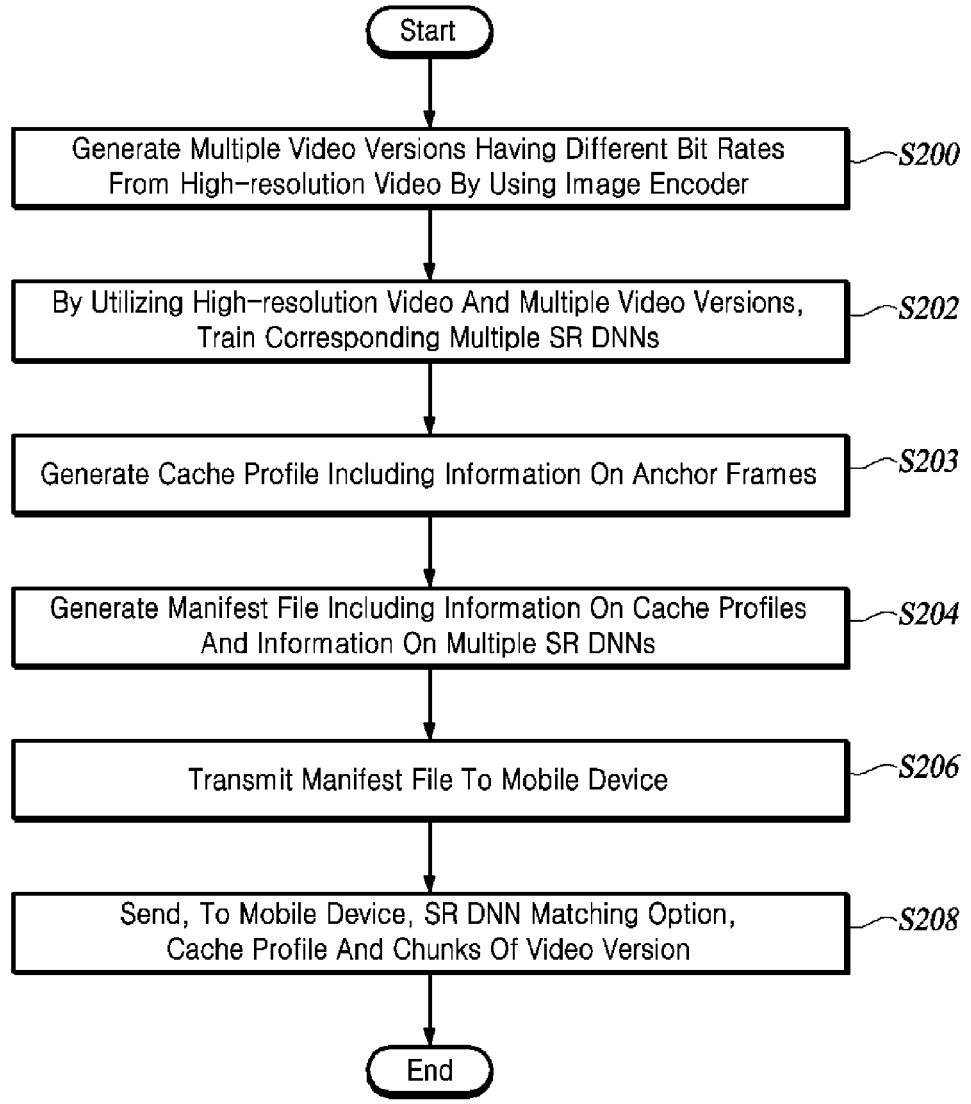
FIG. 2a and FIG. 2b are flowcharts of a method for SR acceleration according to at least one embodiment of the present disclosure.

FIG. 2a is a flowchart of a method for SR acceleration performed by a server and a CDN (contents delivery network) according to at least one embodiment of the present disclosure.

The server generates multiple video versions having different bit rates from a high-resolution video by using an image encoder (S200).

By utilizing the high-resolution video and the multiple video versions, the server trains the corresponding multiple super-resolution deep neural networks (SR DNNs) (S202).

The server generates a cache profile including information on anchor frames (S203). To generate a cache profile, the server selects, for each SR DNN, anchor frames for applying SR within a preset quality margin. Different anchor frames may be selected according to the quality margin and the respective video versions, and the corresponding cache profiles may be generated.

The server generates a manifest file including information on cache profiles and information on the multiple SR DNNs (S204).

The server may provide a plurality of options having different specifications for the respective DNNs. Here, a plurality of options may mean multiple DNNs. Accordingly, the manifest file may include a plurality of options for the DNNs according to the respective video versions and computing capacities and information on the storage locations of the cache profiles in the CDN (contents delivery network).

About video and mobile device-specific constraints, a method for the server to select anchor frames and a process for preparing a plurality of performance options will be described in detail below.

The server provides the CDN with data including the video versions, DNNs, cache profiles, and manifest file, and the CDN utilizes the provided data to perform real-time video streaming for a mobile device.

When the mobile device requests a video, the CDN transmits the relevant manifest file to the mobile device (S206).

Upon obtaining, from the mobile device, the option for the DNN and the information on the cache profile that are selected from the manifest file, the CDN sends the mobile device the SR DNN matching the option, the cache profile, and the chunks of the video version (S208). In case of applying adaptive streaming, the mobile device requires a DNN for each video version. Upon obtaining, from the mobile device, the option for DNN for each video version and the information on the cache profile that are selected from the manifest file, the CDN may send the mobile device the SR DNNs matching the option for each video version, the cache profile, and the chunks of the video versions.

Figure 2B:
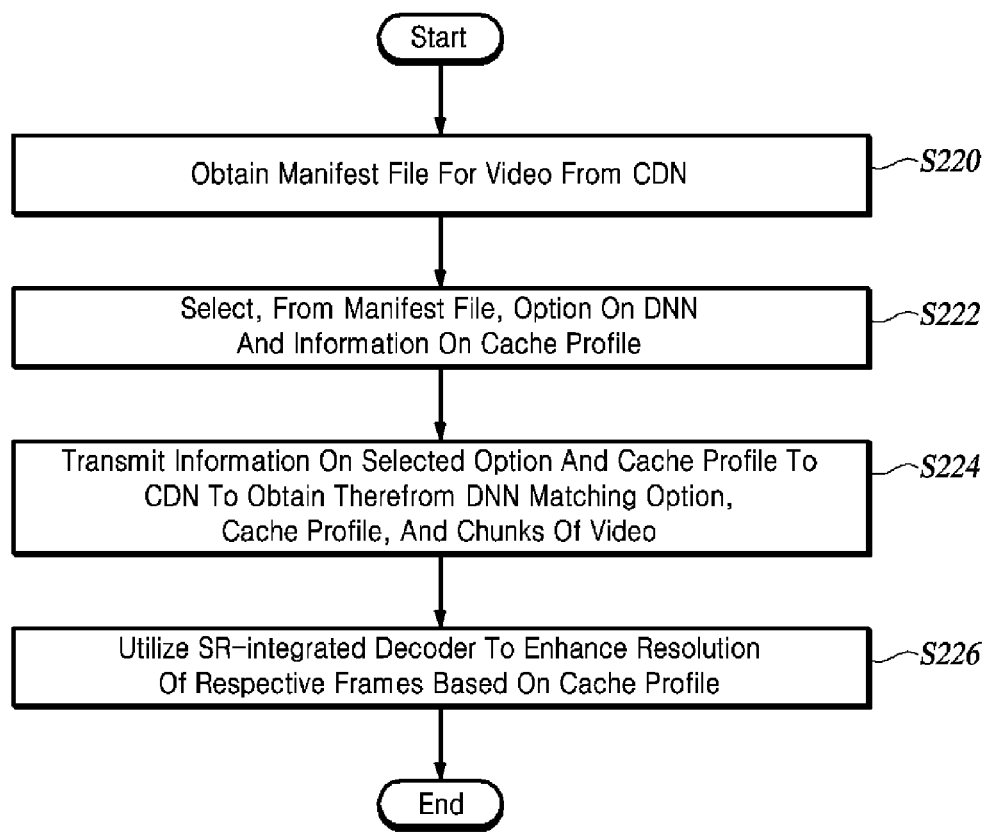

FIG. 2b is a flowchart of a method for SR acceleration performed by a mobile device according to at least one embodiment of the present disclosure.

The mobile device obtains a manifest file for a video desired to be played from the CDN (S220).

The mobile device selects, from the manifest file, an option on the DNN and information on the cache profile (S222). The manifest file includes a list of mobile devices supported by options of each DNN so that the list may be used for selecting an option suitable for the computing capacity of the relevant mobile device. In case of applying adaptive streaming, the mobile device needs a DNN for each video version. Accordingly, The mobile device may select, from the manifest file, an option on the DNN for each video version and information on the cache profile.

The mobile device transmits information on the selected option and cache profile to the CDN to obtain therefrom a DNN matching the option, cache profile, and chunks of a video (S224).

After initializing the SR-integrated decoder by using the DNN, the mobile device utilizes the SR-integrated decoder to enhance the resolution of the respective frames based on the cache profile (S226). The cache profile includes information on whether a frame forming the video chunks is an anchor frame for applying the DNN. An image decoding process for the SR-integrated decoder to perform by using the cache profile will be described in detail below.

Hereinafter, a method of selecting an anchor frame included in a cache profile will be described by the illustrations of FIGS. 3 to 6.

The DNN that is applied to object classification and detection reduces a feature map toward its last layer. Therefore, the scheme of caching and subsequently reusing information on earlier convolution layers of the DNN is known to help improve the classification performance in that the scheme recycles rich information.

On the contrary, the SR DNN provides a high-resolution image reconstruction by enlarging the feature map toward its last layer. Additionally, in terms of computing characteristics, the finally positioned convolutional layer in the SR DNN accounts for most of the computational latency. Therefore, it is not effective to cache the early positioned layer in terms of operation saving and the amount of information. In this consideration, this embodiment arranges the output of the SR DNN to be cached and then reused.

Figure 3:
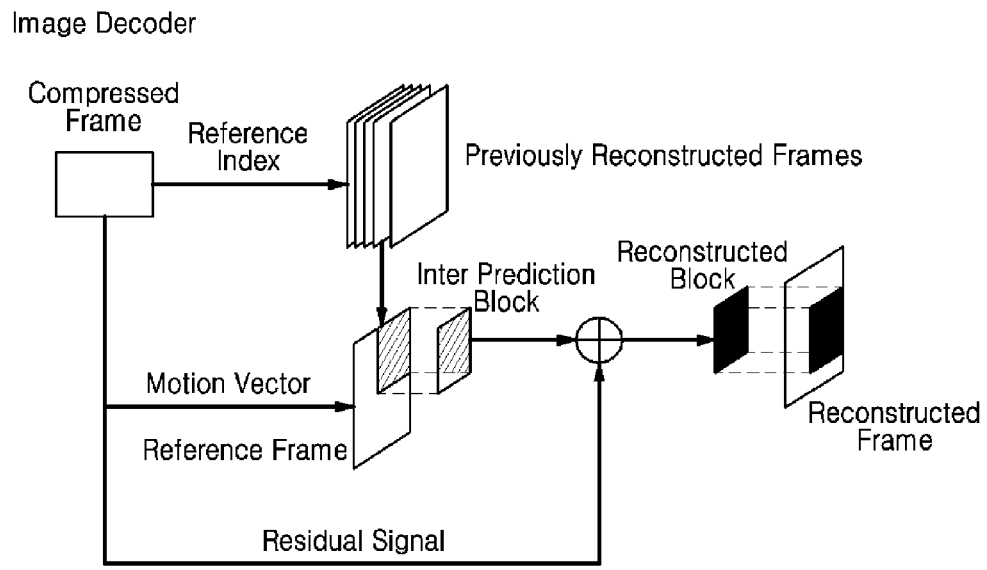
FIG. 3 is an exemplary diagram conceptually explaining inter prediction in an image decoder.

As shown in prior art of FIG. 3, except for the first frame of the GOP, which uses intra-prediction, a typical image decoder reconstructs the current frame through inter-prediction performed depending on previously reconstructed and cached frames. The image decoder obtains a reference frame designated by a reference index and utilizes the reference frame and a motion vector to generate an inter prediction block. The image decoder may add the inter prediction block and a residual signal transmitted from the image encoder to generate a final reconstructed block. The image decoder combines those reconstructed blocks to generate the reconstructed frame which may be cached again to be used as a reference frame for subsequent inter prediction.

Therefore, to use the frame dependency of inter prediction, the SR-integrated decoder according to at least one embodiment reconstructs and then caches a high-resolution frame by applying SR to an anchor frame and transfers the cached high-resolution frame through inter prediction, thereby reconstructing the remaining non-anchor frames. Since the operation quantity for the frame to which SR is applied is hundreds of times higher than that for the non-anchor frames using inter prediction, the SR application to the anchor frames can distribute the computational latency to the non-anchor frames. The distribution of the operation quantity can realize real-time streaming on a mobile device.

Figure 4:
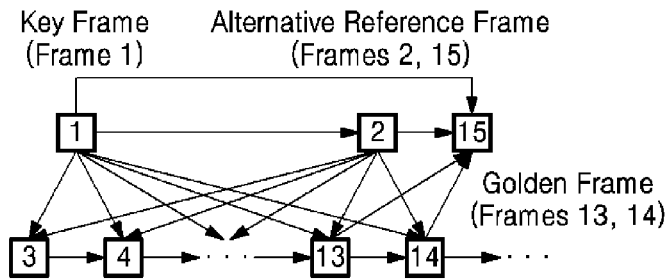
FIG. 4 is an exemplary diagram of a graph showing frame dependency used in a method for SR acceleration according to at least one embodiment of the present disclosure.

To select an anchor frame, reference may be made to a frame dependency generated by an image encoder, as shown in FIG. 4. FIG. 4 shows the frame dependency generated by a commercial image encoder (see Non-Patent Document 4), and it represents a dependency graph for 15 frames included in one GOP in a specific video. The commercial encoder generates, as three kinds of special frames with high reference frequencies, a keyframe, alternative reference frames, and golden frames. Here, the keyframe is the first frame of the GOP, the alternative reference frames are invisible frames inserted to assist inter prediction exclusively, and the golden frames represent frames referenced multiple times. Others than these frames are known to have at most one dependent frame even though they occupy more than 80% of the total frames.

In terms of saving the computing capacity of the mobile device, the smaller the number of anchor frames is, the more advantageous. Therefore, a method, which is composed of primarily selecting the aforementioned distinctive frames as anchor frames, applying SR to such distinctive anchor frames, and reusing the result thereof, can provide a quality improvement to the remaining plurality of frames.

When increasing the resolution of other frames by using the cached high-resolution frame as described above, quality degradation inevitably occurs, which is expressed as cache erosion. The size of the cache erosion is video content-dependent. Hereinafter, the cache erosion is defined as the difference in Peak Signal to Noise Ratio (PSNR) between a case where SR is applied to every frame and a case where SR is applied just to the anchor frames as in the present embodiment. Instead of randomly or uniformly selecting anchor frames, this embodiment selects optimal anchor frames to maintain the cache erosion within a preset quality margin.

Selecting the optimal anchor frames is to minimize the number of selected anchor frames in that it can save the computing capacity of the mobile device. An optimization goal for selecting the least anchor frames may be expressed as Equation 1.

$$\min_{\{AF\}} |\{AF\}| \text{ where } \{AF\} \subset \{F\} \qquad \text{Equation 1}$$
$$\text{s.t. } VQ(DNN(\{F\})) - VQ(DNN(\{AF\})) \le VQ_T$$

Here, VQ(DNN({•})) are improvements in quality in the case where SR DNN is applied to the {•} frames, compared to the case where no SR is applied to the same frames, and it may be expressed as the PSNR difference between the two cases. {F} is the entire set of video frames, {AF} is the set of anchor frames, and |•| indicates the size, that is, the number of objects. $VQ_T$ is a preset quality margin. Equation 1 indicates selecting the minimum AF so that the difference in quality improvement between the case where the SR DNN is applied to every frame and the case where SR is applied just to the anchor frames, that is, the cache erosion satisfies the quality margin.

To select the anchor frames as shown in Equation 1, the server needs to search through a search space at the level of $2^{|frame|}$. Here, 'frame' is the number of total frames forming a video or video chunks. This is a level that is difficult to realize even with the computing capacity of the server. Therefore, to reduce the search space, where the anchor frames are sparse, it is assumed that the quality improvement of the other frames depends on the anchor frame that has the greatest influence.

Under this premise, with the set {AF} of anchor frames given, the quality gain for an arbitrary frame may be approximated, as shown in Equation 2, to the maximum value among the quality gains for such one frame as one anchor frame is given out of {AF}.

$$FQ(i \mid DNN(\{AF\})) = \max_{f \in \{AF\}} FQ(i \mid DNN(\{f\})) \qquad \text{Equation 2}$$

Here, FQ(i|DNN({•})) represents a quality improvement for the i-th frame when SR DNN is applied to anchor frames. Additionally, DNN ({f}) indicates that the SR DNN is applied to just one anchor frame f.

By using the gain for one frame as shown in Equation 2, calculating the average for all frames as shown in Equation 3 allows the video quality to be approximated.

$$VQ(DNN(\{AF\})) = \sum_{i=1}^{|frame|} \max_{f \in \{AF\}} \frac{FQ(i \mid DNN(\{f\}))}{|frame|} \qquad \text{Equation 3}$$

As shown in Equation 3, based on the quality measurement for all possible combinations of anchor frames having a size of 1, the server calculates a quality gain for a set of arbitrary anchor frames, thereby reducing the size of the search space from $2^{|frame|}$ It to the order of 'frame'.

Figure 5:
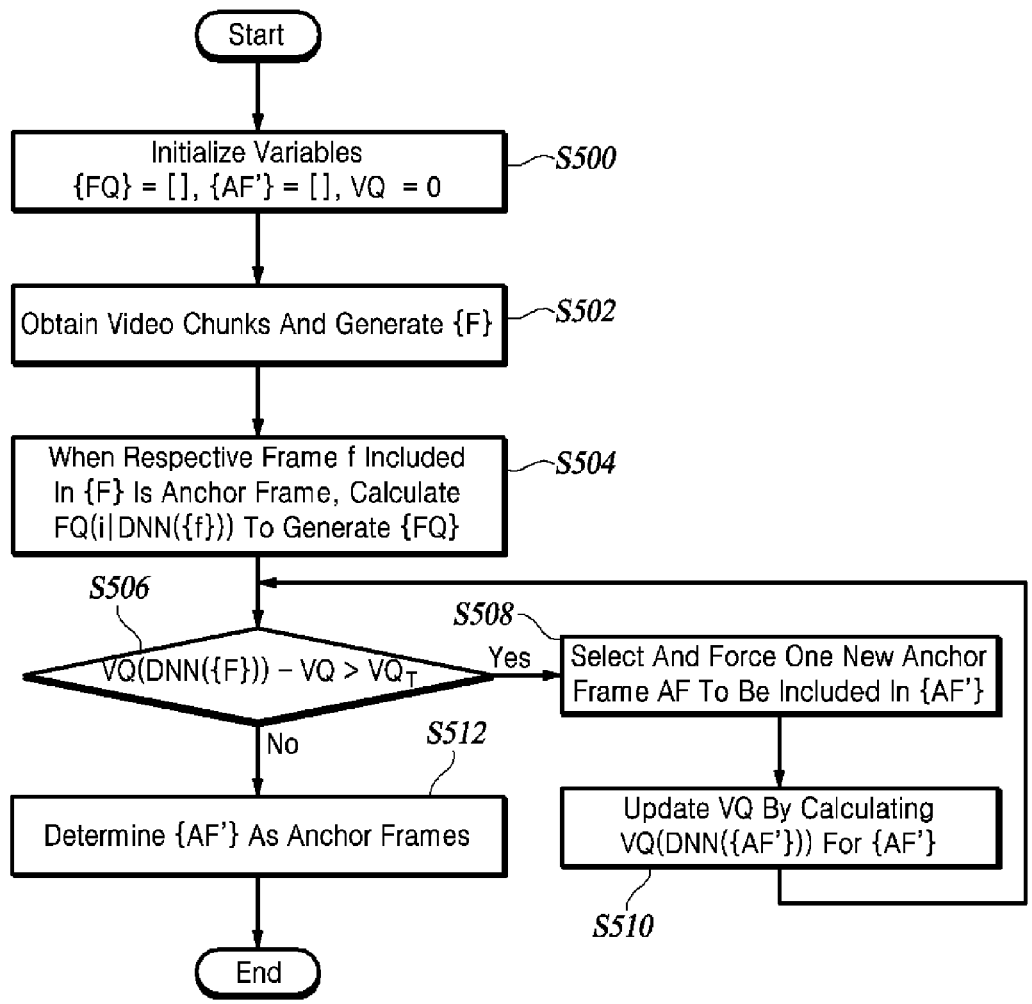
FIG. 5 is a flowchart of a method of selecting anchor frames according to at least one embodiment of the present disclosure.

FIG. 5 is a flowchart of a method of selecting anchor frames according to at least one embodiment of the present disclosure.

The server initializes variables (S500). Set as an empty set is set {FQ} of quality gains FQ=FQ(i|DNN({f})) of the i-th frame when SR DNN is applied to just one anchor frame f. Additionally, the set {AF'} of selected anchor frames is also set as an empty set. Further, set to zero is the quality gain VQ=VQ (DNN({AF'})) for all the video chunks when SR is applied to the set {AF'} of anchor frames.

The server obtains video chunks and generates a set {F} of frames (S502). In consideration of frame dependency, it is assumed that the video chunks include one or more groups of GOPs. 'frame' is the total number of frames included in the video chunks. Therefore, $1 \leq i$ and $f \leq |frame|$.

Figure 6:
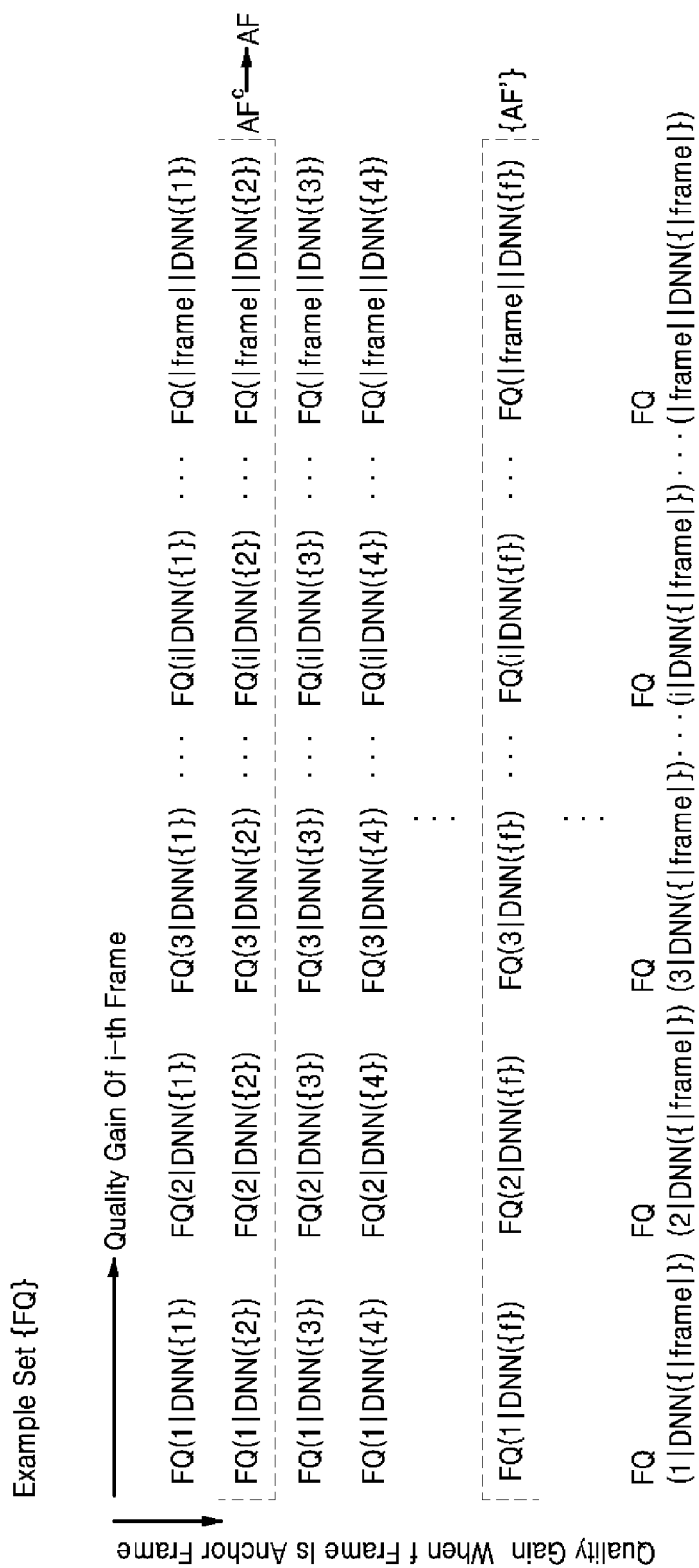
FIG. 6 is an exemplary diagram of a set of quality gains according to at least one embodiment of the present disclosure.

The server generates the quality gains set {FQ} by calculating FQ(i|DNN({f})) when respective frame f included in the set {F} is an anchor frame (S504). For 'frame' frames, when only frame f is the anchor frame. the quality gains FQ (i|DNN({f})) of the i-th frames may be calculated to generate the example set {FQ} as shown in FIG. 6. In this case, an SR-integrated decoder may be used to calculate the quality gains FQ.

The server compares, with a preset quality margin $VQ_T$, the difference between the video quality gain VQ (DNN ({F})) when SR is applied to all frames and the quality gain VQ for all the video chunks when SR is applied to the set {AF'} of anchor frames (S506).

When the difference VQ(DNN({F}))-VQ is larger than preset quality margin $VQ_T$, the server selects and forces one new anchor frame AF to be included in {AF'} (S508).

First, when the set {AF'} of selected anchor frames is an empty set, upon determining that the sum (or average) of FQs in one row illustrated in FIG. 6 (e.g., a row in which the f frame is assumed as an anchor frame) is the maximum, this frame is selected as the first anchor frame. Therefore, {AF'}={f}. Next, the second anchor frame may be selected as shown in Equation 4.

$$\max_{f \in \{AF\}} VQ(DNN(AF^c \cup \{AF'\})) \approx \max_{AF^c \in \{F\}} \left( \sum_{i=1}^{|frame|} \max_{f \in \{AF^c \cup \{AF'\}\}} \frac{FQ(i \mid DNN(\{f\}))}{|frame|} \right) \quad \text{Equation 4}$$

The server adds one candidate frame $AF^c$ to {AF'}, and it first calculates a video quality gain VQ(DNN({AF'}∪AFC)) by using Equation 3. For example, as illustrated in FIG. 6, when {AF'}={f} and the second frame is $AF^c$, VQ(DNN ({f}∪$AF^c$)) may be calculated for {f}∪$AF^c$ by using Equation 3.

Since the one candidate frame $AF^c$ can be any frame not included in {AF'}, a candidate frame that maximizes VQ(DNN({AF'}∪$AF^c$)) as shown in Equation 4 is selected as a new anchor frame AF and included in {AF'}. For example, in the example of FIG. 6, when a second frame is $AF^c$ and VQ(DNN({f}∪$AF^c$)) is determined to be maximum, $AF^c$ may be selected as a new anchor frame AF.

The server may select the third and subsequent anchor frames by using the above-described process.

The server updates VQ by calculating VQ(DNN({AF'})) for {AF'}, which is the quality gain for all the video chunks when SR is applied to the set {AF'} of anchor frames (S510) and then compares the updated VQ with the video quality gain VQ(DNN({F})) (S506), repeating these steps over and over. In this case, the SR-integrated decoder may be used to calculate VQ(DNN({AF'})).

The server operates, within a preset quality margin, to determine the selected {AF'} up to now as anchor frames (S512).

The method of selecting an anchor frame described above may operate by adapting to an intrinsic attribute of a video. In particular, because of the maximum selection function (maxi) included in the right-hand term of the approximation equation of Equation 4, a frame having a greater influence or frequent reference is more likely to be selected as an anchor frame. Additionally, the more rapid cache erosion a video exhibits, the more anchor frames may be selected to satisfy a preset quality margin.

Meanwhile, being a margin for quality when SR is applied to every frame of a video, the quality margin is a settable parameter, the set value of which may prescribe which cache profile is to be generated. The quality margin is usually set at 0.5 dB, but there may also be a plurality of settings in relation to battery consumption, which will be described below.

Figure 7:
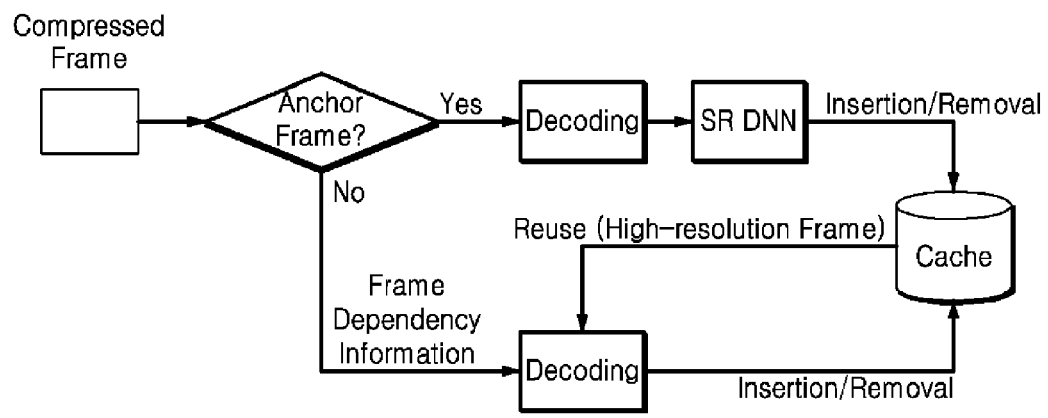
FIG. 7 is a conceptual block diagram illustrating the operation of the SR-integrated decoder according to at least one embodiment of the present disclosure.
Figure 8:
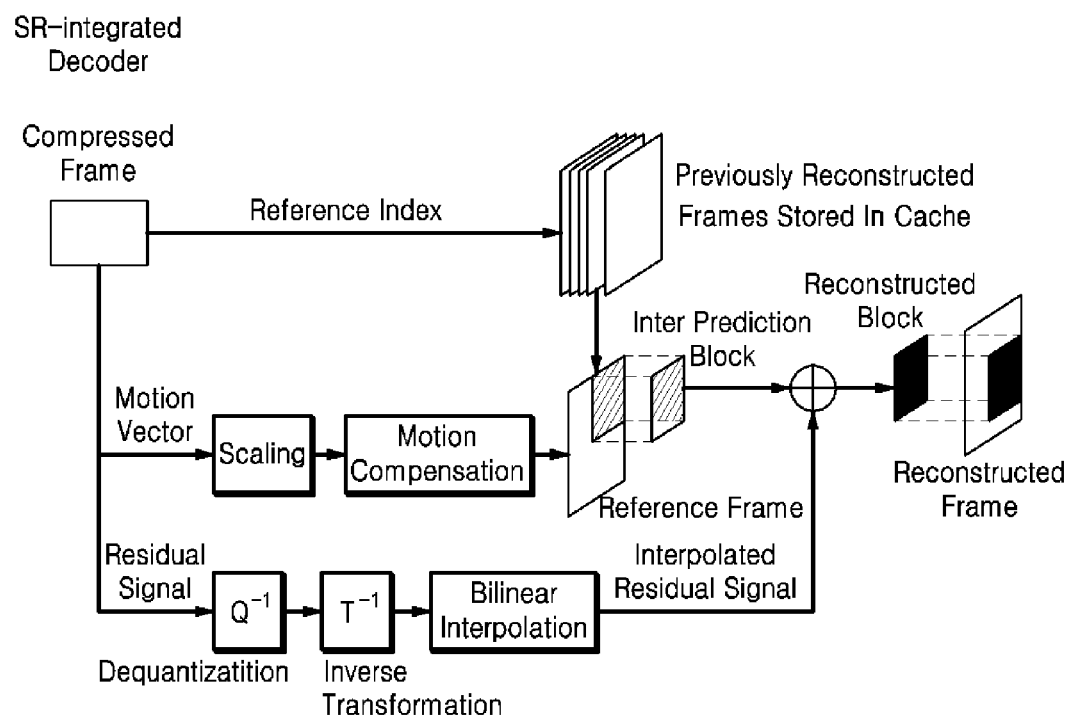
FIG. 8 is a conceptual illustration of inter-prediction performed on a non-anchor frame according to at least one embodiment of the present disclosure.

The following describes a video decoding method performed by the SR-integrated decoder (Step S226) with reference to FIGS. 7 and 8.

FIG. 7 is a conceptual block diagram illustrating the operation of the SR-integrated decoder according to at least one embodiment of the present disclosure.

The SR-integrated decoder transforms a compressed low-resolution frame into a high-resolution frame by using a cache profile and an SR DNN. Upon obtaining the compressed low-resolution frame, the SR-integrated decoder checks whether the obtained frame is an anchor frame by using the cache profile. When the obtained frame is an anchor frame, the SR-integrated decoder decodes the low-resolution frame from the current frame, applies the SR DNN to the low-resolution frame to enhance the same into a high-resolution frame, and caches the generated high-resolution frame for future use. When the obtained frame is a non-anchor frame, the SR-integrated decoder utilizes information on a frame dependency and previous cached high-resolution frames to generate a high-resolution enhancement to the current frame and cache the generated high-resolution frame for future use.

Meanwhile, the current frame includes intra-prediction blocks and inter prediction blocks that do not overlap each other, and it is decoded based on these blocks.

FIG. 8 is a conceptual illustration of inter-prediction performed on a non-anchor frame according to at least one embodiment of the present disclosure.

When the current frame is a non-anchor frame, the SR-integrated decoder may reconstruct the inter prediction blocks by using the cached high-resolution frame as a reference frame. To perform inter prediction, the SR-integrated decoder receives reference indices and motion vectors for the inter prediction blocks from an image encoder. Using the reference indices, the SR-integrated decoder selects a reference frame from previously reconstructed high-resolution frames that are cached. Additionally, the size of the motion vectors is adjusted. For example, when the resolution is increased from 360p to 1080p resolution, the motion vectors are also enlarged by three times.

The SR-integrated decoder generates inter prediction blocks of the current frame by performing motion compensation for predicting target blocks from a reference frame by using the adjusted motion vectors. Using an appropriate interpolation method (e.g., bilinear interpolation method), the SR-integrated decoder may first increase the resolution of the residual signal transmitted from the image encoder, then add the higher resolution residual signal to the inter prediction blocks, and thereby generate high-resolution reconstructed blocks. Increasing the resolution by using the interpolation method may cause a loss in a high-frequency band and, consequently, cache erosion. Some of this cache erosion may be compensated for by using the anchor frame selection method as described above.

The SR-integrated decoder generates an intra-prediction block by using neighboring pixels in the same frame. Unable to use the cached frame, intra-prediction is a difficult matter. However, due to their high dependency on reference frequency, most of the intra-prediction blocks are included in keyframes or alternative reference frames that are frequently selected as anchor frames. Accordingly, intra-prediction may be solved by applying SR DNN to an intra-prediction block included in an anchor frame, and applying interpolation to an intra-prediction block included in a non-anchor frame.

The following describes a detailed process performed by a server for preparing various performance options with respect to video and mobile device-specific constraints.

To perform online video streaming, video streaming needs to be processed in real-time (e.g., 30 frames per second or fps). However, to satisfy a preset quality margin, the server may generate a different number of anchor frames for each of the video chunks by using the anchor frame selection method. Additionally, mobile devices have heterogeneous characteristics in that they have varying computing capacities.

To process real-time streaming under such device and video-specific constraints, the server provides a plurality of performance options for each video version (e.g., 'Low', 'Mid', and 'High' performance options). For the respective performance options, the server may provide separate DNNs with varying quality and computing requirements. Further, for each of the DNNs, the server may generate a cache profile by using the anchor frame selection method.

The mobile device may select, based on its computing capacity, one of a plurality of given performance options. To facilitate the mobile device to select an option, the server according to some embodiments of the present disclosure presents a guideline by using a measurement result dependent on a device pool. Here, the device pool refers to a set up for carrying out various options in each mobile device (or mobile processor).

On the other hand, each mobile device needs to find an option for each video. However, given the massive presence of video offerings, even a server cannot easily test all possible options for each video. Alternatively, to estimate the processing latency of anchor frames and non-anchor frames, the server causes each mobile device to carry out one option for a sample video. Based on the measurement result for the sample video, a rough processing latency for another target video may be estimated as shown in Equation 5.

$$\text{Latency}=|AF|\times T(AF)+|None\_AF|\times T(NONE\_AF) \quad \text{Equation 5}$$

Here, |AF| and |None_AF| represent the numbers of anchor frames and non-anchor frames of the target video, respectively. T(AF) and T(None_AF) denote processing latencies of anchor frames and non-anchor frames measured from the sample video, which are values dependent on the mobile device. By iterating the processing latency estimation as shown in Equation 5 for the respective video chunks included in the video, the server may estimate the worst processing latency generated by the video and reflect the estimated worst processing latency in the performance option. Each mobile device may select the highest quality option within the limits of real-time constraints.

To assist the mobile device with the option selection, a manifest file inclusive of information for the option selection is provided from the server to the mobile device. For each mobile device and DNN option, the server may generate a manifest file by carrying out the process of preparing the performance options as described above once offline. The manifest file may include options for each DNN and a list of mobile devices that the options can support.

On the other hand, some users may be more sensitive to battery life than any other factor. To accommodate these users' preferences, the server may provide various options for battery performance based on a plurality of quality margins. Concerning the battery performance options and battery consumption status, the user can attempt a dynamic trade-off between video quality and energy consumption.

As described above, according to some embodiments of the present disclosure, an apparatus and a method for super-resolution (SR) acceleration in video streaming on a mobile device, wherein a server delivers multiple options for the deep neural network and a cache profile including SR application information while the mobile device is capable of selecting an option suitable for its computing capacity, thereby allowing the real-time video streaming under video-specific constraints and within the mobile devices' computing capacities.

The following describes a result of evaluating the performance of the SR accelerator 100 according to some embodiments of the present disclosure.

To conduct the performance test, a commercial image encoder (refer to Non-patent Document 4) was modified to implement an SR accelerator on the server side, and a commercial image decoder (refer to Non-patent Document 5) was modified to implement an SR accelerator on the mobile device side. The model and training for SR DNN were implemented by using the method of NAS (see Non-Patent Document 2), but the present embodiment was implemented experimentally to reduce memory usage by replacing sub-pixel convolution with deconvolution. In this case, the SR DNN was used after removing the last convolutional layer which has a small benefit of realizing super-resolution but involves a large processing latency.

For a mobile device in the performance evaluation, a high-end smartphone was used as a first device (see Non-Patent Document 6). Other unmentioned mobile devices were used, such as entry-level smartphones and tablets for performance evaluation, but they exhibited similar measurement results to those of the first device.

Used as a video dataset was videos obtained from the respective top-ten categories on a commercial CDN site (see Non-patent Document 7). Here, the ten video categories are 'Product review' (C1), 'Howto' (C2), 'Vlogs' (C3), 'Game play' (C4), 'Skit' (C5), 'Haul' (C6), 'Challenges' (C7), 'Favorite' (C8), 'Education' (C9), and 'Unboxing' (C10). The respective videos support 4K resolution at 30 fps and are at least 5 minutes long. The test follows Wowza's recommendation (refer to Non-patent Document 8) for adaptive streaming to encode, by using a commercial image encoder, the videos into video versions with resolutions of {240, 360, 480, 720, 1080}p having bit rates of {512, 1024, 1600, 2640, 4400} kbps, respectively. The size of the GOP (Group of Pictures) is 120 frames which correspond to 4 seconds. Raw video with a resolution of 1080p was used as a standard for measuring PSNR (Peak Signal to Noise Ratio). Five minutes of playback time were used to measure the performance of the respective video versions.

Used for the first baseline is a per-frame SR in which an SR DNN is applied for every frame, utilizing three SR DNNs of per-frame Low SR, per-frame Mid SR, and per-frame High SR according to options for each of the video versions. For the second baseline, an interpolation method was used instead of applying SR DNN. Meanwhile, the first device assumed to improve the videos with the resolutions of {240, 360, and 480}p to those with 1080p.

Table 1 shows the video processing throughput according to the present embodiment.

TABLE 1

(Video Throughput(fps))

| Option* | Embodiment | Per-frame Low | Per-frame Medium | Per-frame High |
|---|---|---|---|---|
| C1 | H | 84.5 | 7.1 | 6.9 | 5.2 |
| C2 | H | 72.7 | 7.1 | 7.1 | 5.3 |
| C3 | M | 99.0 | 7.1 | 6.7 | 5.4 |
| C4 | H | 96.2 | 7.1 | 6.9 | 5.2 |
| C5 | M | 59.4 | 7.0 | 6.7 | 5.2 |
| C6 | M | 95.2 | 7.1 | 6.7 | 5.2 |
| C7 | H | 89.9 | 7.0 | 6.8 | 5.3 |
| C8 | M | 109.3 | 7.1 | 6.4 | 5.4 |
| C9 | M | 119.8 | 7.1 | 6.8 | 5.1 |
| C10 | H | 94.7 | 10.6 | 6.5 | 5.7 |

*Option as selected by the present embodiment.

To verify the effect of applying SR to the anchor frame, the resolution of the video version was fixed to 240p. The SR accelerator 100 on the first device enhances the resolution of the video version to 1080p by using an SR-integrated decoder. The SR accelerator 100 selected SR DNNs having different performances (H: High, M: Medium) for respective video categories. The SR accelerator 100 achieved 59 to 120 fps, thereby improving the average throughput by 15 times or more compared to the per-frame SR schemes. This throughput improvement is thanks to the fact that only a portion (3.1 to 10.9%) of the whole frame is selected as anchor frames so that the latency due to SR application is distributed toward the non-anchor frame side.

Table 2 shows the quality gain according to the present embodiment.

TABLE 2

(PSNR Gain(dB))

| Option* | Embodiment | Per-frame Low | Per-frame Medium | Per-frame High |
|---|---|---|---|---|
| C1 | H | 1.48 | 1.19 | 1.7 | 1.9 |
| C2 | H | 1.67 | 1.48 | 1.88 | 2.11 |
| C3 | M | 0.98 | 1.22 | 1.44 | 1.6 |
| C4 | H | 1.31 | 1.16 | 1.52 | 1.75 |
| C5 | M | 2.05 | 1.7 | 2.51 | 2.87 |
| C6 | M | 3.5 | 3.16 | 3.95 | 4.38 |
| C7 | H | 2.15 | 1.86 | 2.31 | 2.56 |
| C8 | M | 1.33 | 1.45 | 1.77 | 1.96 |
| C9 | M | 3.31 | 2.58 | 3.67 | 4.14 |
| C10 | H | 3.09 | 1.85 | 2.72 | 3.45 |

*Option as selected by the present embodiment.

The resolution of the video version used is 240p. As described above, with a raw video of 1080p resolution used as a reference, the PSNR quality of this embodiment and the first baseline (per-frame SR) was measured by using the YUV420 color space. The quality gain shown in Table 2 represents those for the PSNR of the video generated according to the second baseline. The SR accelerator 100 had a PSNR of 26.0 to 37.8 dB to achieve an excellent quality gain (0.98 to 3.5 dB) compared to the PSNR of the video according to the second baseline. Additionally, even when compared with the per-frame SR, the SR accelerator 100 exhibits a performance difference within 0.5 dB, and for some categories, it improved quality gain than the per-frame Low and/or the per-frame Medium.

On the other hand, energy consumption was measured by using category C10, and the selected SR DNN option was High. The SR accelerator 100 reduced energy consumption by 88% or more compared to per-frame High processing, thereby increasing the battery use time by 5 hours or longer. Additionally, with the lowered energy consumption, the temperature of the first device was kept very lower than an appropriate level even in a long test, where the temperature at which the user starts to feel uncomfortable is 35 degrees Celsius.

In the real-time streaming of the SR accelerator 100 according to the present embodiment, the QoE (Quality of Experience) improvement was measured. To this end, the actual 3G/wideband network traces of Pensieve (refer to Non-patent Document 9) were used, while filtering out traces having a bandwidth of 4.4 Mbps or more that do not provide gain according to adaptive streaming. The average bandwidth of the used network traces is 1.3 Mbps. To perform adaptive streaming on the network traces, the Pensieve simulator was extended to include the integrated ABR algorithm used in the NAS, so that DNN and video were streamed simultaneously.

The performance test used, as the QoE metric, the metric that was used by the NAS and formed based on 1) the selected bit rates for the respective video chunks, 2) rebuffering time, and 3) quality differences between consecutive video chunks, among others. As the bit rates for the video chunks, effective bit rates were calculated to reflect the quality improvement according to SR. The test devised and used a function for converting the PSNR quality to the effective bit rate.

The SR accelerator 100 on the first device was used to measure QoE of real-time streaming for ten video categories, and the test used, as a third baseline, a Pensieve ABR algorithm-based adaptive streaming to which no SR is applied. Compared to the third baseline, the SR accelerator 100 exhibited an average QoE improvement of 32%.

Additionally, the SR accelerator 100 can reduce bandwidth usage instead of improving QoE. To measure the bandwidth saving, the bandwidth used by the SR accelerator 100 was reduced to have the same QoE as that of the third baseline. The measured bandwidth reduction was about 21% on average compared to the third baseline.

In the anchor frame selection method according to the present embodiment, a penalty for the reduction of the search space was measured. To reduce the search space, an approximation of the quality gain as shown in Equation 3 was performed, and the resulting average PSNR loss was found to be 0.11 dB, which can be tolerated.

Cache erosion according to the anchor frame selection method according to the present embodiment was measured. When using the selected anchor frames according to the present embodiment, the average cache erosion per video chunk was limited to within 0.5 dB, which was found to be excellently small in comparison with an average cache erosion of 2.1 dB of anchor frames when randomly selected and an average cache erosion of 1.3 dB of anchor frames when uniformly selected.

Additionally, when applying the anchor frame selection method according to the present embodiment to a commercial image encoder (see Non-Patent Document 4), it was confirmed that about 80% of the selected anchor frames was composed of keyframes and alternative reference frames having high frame dependency.

As described above, according to some embodiments of the present disclosure, an apparatus and a method for SR acceleration are provided for performing real-time video streaming on a mobile device, which apply deep neural network-based super-resolution (SR) to a small number of pre-selected video frames and utilize the SR-processed video frames to enhance the resolution of the remaining frames, to achieve an increased video processing throughput of the mobile device, reduced energy consumption to keep the mobile device at an appropriately cool level, and an improved user QoE even under bandwidth constraints.

Although the steps in the respective flowcharts according to the embodiments are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by the flowcharts or by performing one or more of the steps in the flowcharts in parallel, without departing from the gist and the nature of the at least one embodiment of the present disclosure, and hence the steps in the flowcharts are not limited to the illustrated chronological sequences.

Various implementations of the system and techniques, including of the components, elements, modules or units represented by a block in the drawings (e.g., FIG. 1), described herein may be realized by digital electronic circuitry, integrated circuits, field-programmable gate arrays (FPGAs), application-specific integrated circuits (ASICs), computer hardware, firmware, software, and/or their combinations. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of the computer-readable recording medium include non-transitory media such as a ROM, CD-ROM, magnetic tape, floppy disk, memory card, hard disk, optical/magnetic disk, storage devices. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method performed by a mobile device for accelerating a super-resolution (SR), the method comprising:
    obtaining a manifest file for a video from a server;
    selecting, from the manifest file, an option on a super-resolution deep neural network (SR DNN) and information on a cache profile;
    transmitting the option and the information on the cache profile to the server and obtaining, from the server, the SR DNN corresponding to the option, the cache profile, and video chunks; and
    initializing an SR-integrated decoder by using the SR DNN and then enhancing, based on the cache profile, a resolution of a current frame that forms the video chunks by using the SR-integrated decoder,
    wherein the cache profile includes data on whether the current frame is an anchor frame for using the SR DNN.

2. The method of claim 1, wherein the manifest file further includes a list of mobile devices that are supported by options on SR DNNs, and
    wherein the selecting the option comprises:
    selecting, by using the list, the option that is suitable for a computing capacity of the mobile device.

3. The method of claim 1, wherein the information on the cache profile is a location of the cache profile stored in the server.

4. The method of claim 1, wherein the enhancing of the resolution comprises:
    when the current frame is determined to be the anchor frame, decoding, by the SR-integrated decoder, a low-resolution frame from the current frame and then generating and caching a high-resolution frame for the low-resolution frame by applying the SR DNN.

5. The method of claim 1, wherein the enhancing of the resolution comprises:
    when the current frame is determined not to be the anchor frame, generating and caching a high-resolution frame for the current frame by the SR-integrated decoder through an inter prediction and an intra-prediction, based on information on a frame dependency and previously cached high-resolution frames.

6. An apparatus for super-resolution (SR) acceleration installed in a mobile device, the apparatus comprising:
    an input/output unit configured
        to obtain a manifest file for a video from a server,
        to select, from the manifest file, an option on a super-resolution deep neural network (SR DNN) and information on a cache profile, and
        to transmit the option and the information on the cache profile to the server and obtain, from the server, the SR DNN corresponding to the option, the cache profile, and video chunks; and
    a decoding unit configured to initialize an SR-integrated decoder by using the SR DNN and then enhance, based on the cache profile, a resolution of a current frame that forms the video chunks by using the SR-integrated decoder,
    wherein the cache profile includes data on whether the current frame is an anchor frame for using the SR DNN.

7. The apparatus of claim 6, wherein the manifest file further includes a list of mobile devices that are supported by options on SR DNNs, and
wherein the input/output unit is configured to select, by using the list, the option that is suitable for a computing capacity of the mobile device.

8. The apparatus of claim 6, wherein the information on the cache profile is a location of the cache profile stored in the server.

9. The apparatus of claim 6, wherein the decoding unit is configured to cause, when the current frame is determined to be the anchor frame, the SR-integrated decoder to decode a low-resolution frame from the current frame and then generate and cache a high-resolution frame for the low-resolution frame by applying the SR DNN.

10. The apparatus of claim 6, wherein the decoding unit is configured to cause, when the current frame is determined not to be the anchor frame, the SR-integrated decoder to generate and cache a high-resolution frame for the current frame through an inter prediction and an intra-prediction, based on information on a frame dependency and previously cached high-resolution frames.

11. A method performed by a server for super-resolution (SR) acceleration, the method comprising:
obtaining a video;
generating multiple video versions corresponding to multiple bitrates from the video by using an image encoder;
training, by using the video and the multiple video versions, corresponding multiple super-resolution deep neural networks (SR DNNs);
selecting anchor frames, for each of the multiple SR DNNs from the video versions, as bounded by a preset quality margin and generating a cache profile including information on the anchor frames; and
generating a manifest file including information on the cache profile and information on the multiple SR DNNs.

12. The method of claim 11, wherein the manifest file further includes a list of mobile devices that are supported by each of options on each of the multiple SR DNNs.

13. The method of claim 12, further comprising:
in response to a mobile device requesting the video, transmitting the manifest file to the mobile device, obtaining, from the mobile device, an option on an SR DNN and information on the cache profile which are selected from the manifest file, and then transmitting, to the mobile device, the SR DNN corresponding to the option, the cache profile, and video chunks.

14. The method of claim 11, wherein the selecting of the anchor frames comprises:
selecting the anchor frames so that a total number of the anchor frames is minimized as long as cache erosion is maintained within the preset quality margin, the cache erosion being a quality difference between an application of a SR DNN to all frames of a video version and an application of the SR DNN exclusively to the anchor frames of the video version.

15. The method of claim 11, wherein the selecting of the anchor frames comprises:
calculating, based on measurements of qualities of all possible combinations of the anchor frames of size 1 from using an SR-integrated decoder, a quality gain for a set of anchor frames and thereby downsizing a search space for selecting the anchor frames.

16. The method of claim 11, wherein the cache profile includes data on whether frames included in the video versions are each an anchor frame for using the SR DNNs, and the information on the cache profile is a location of the cache profile stored in the server.

17. The method of claim 16, wherein the SR-integrated decoder is responsive to a current frame being determined to be the anchor frame for decoding a low-resolution frame from the current frame and then generating and caching a high-resolution frame for the low-resolution frame by applying the SR DNNs.

18. The method of claim 16, wherein the SR-integrated decoder is responsive to a current frame being determined not to be the anchor frame for generating and caching a high-resolution frame for the current frame through an inter prediction and an intra-prediction, based on information on a frame dependency and previously cached high-resolution frames.

19. A computer program stored in a non-transitory computer-readable medium for executing the method performed by a mobile device for super-resolution acceleration according to claim 1.

20. A computer program stored in a non-transitory computer-readable medium for executing the method performed by the server for super-resolution acceleration according to claim 11.

* * * * *